United States Patent
Soga et al.

(10) Patent No.: US 6,420,500 B1
(45) Date of Patent: *Jul. 16, 2002

(54) CATALYST FOR α-OLEFIN POLYMERIZATION

(75) Inventors: Kazuo Soga, Tatsunokuchi-machi; Toshiya Uozumi, Matto; Eiichi Kaji, Kanazawa, all of (JP)

(73) Assignee: Tosoh Akzo Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,328

(22) PCT Filed: Apr. 2, 1998

(86) PCT No.: PCT/JP98/01516

§ 371 (c)(1), (2), (4) Date: Dec. 31, 1998

(87) PCT Pub. No.: WO98/44010

PCT Pub. Date: Oct. 8, 1998

(30) Foreign Application Priority Data

Apr. 3, 1997 (JP) .............................................. 9-100916
Apr. 8, 1997 (JP) .............................................. 9-105181

(51) Int. Cl.[7] .................................................. C08F 4/32

(52) U.S. Cl. ........................ 526/142; 526/151; 526/158; 526/123.1; 502/103; 502/172; 502/115; 502/132

(58) Field of Search ................................. 502/103, 172, 502/115, 132, 105; 526/151, 158, 142, 123.1

(56) References Cited

U.S. PATENT DOCUMENTS 4,900,706 A * 2/1990 Sasaki et al. ................ 502/116
5,223,465 A * 6/1993 Ueki et al. ................... 502/117

FOREIGN PATENT DOCUMENTS

| JP | 06263815 A | * | 9/1994 |
| JP | 09012624 A | * | 1/1997 |
| WO | 91/13917 A1 | * | 9/1991 |

OTHER PUBLICATIONS

Soga et al., J Polym Sci A: Polym Chem 35: 823–826, 1997.*

* cited by examiner

*Primary Examiner*—David W. Wu
*Assistant Examiner*—Ling-Siu Choi
(74) *Attorney, Agent, or Firm*—Oblon, Spivak, McClelland, Maier & Neustadt, P.C.

(57) ABSTRACT

A novel supported catalyst component useful for α-olefin polymerization and a method of polymerizing an α-olefin using the same. The catalyst component is characterized by being prepared by contacting a complex represented by general formula (I) wherein $R^1$ and $R^2$ are the same or different and each represents a $C_{1-6}$ linear or branched alkyl, a $C_{1-3}$ haloalkyl, or optionally substituted phenyl; and X represents a halogeno with magnesium compound.

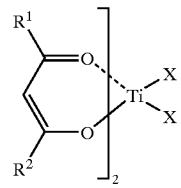

(1)

16 Claims, 1 Drawing Sheet

(A) Transition metal catalyst component
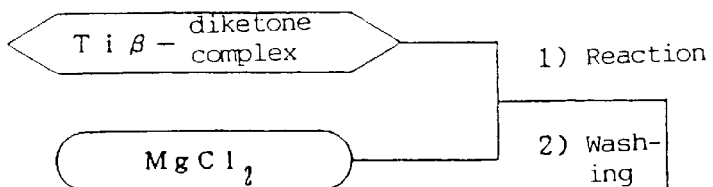
1) Reaction
2) Washing
(B) Metallic catalyst component
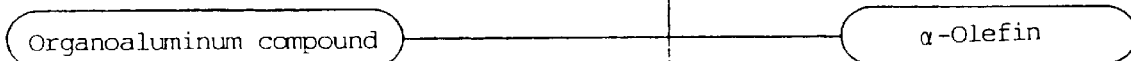
α-Olefin
(C) Third component
(Electron donor compound)

CATALYST FOR α-OLEFIN POLYMERIZATION

TECHNICAL FIELD

The present invention relates to a novel supported catalyst component useful for α-olefin polymerization and a method of polymerizing an α-olefin using the same. In more detail, the intention relates to a catalyst component with transition metal complex supported onto a carrier such as magnesium chloride and a method of efficiently and stereoselectively homo- or co-polymerizing an α-olefin such as ethylene or propylene, using the same.

BACKGROUND TECHNOLOGIES

It is publicly known that, generally, as a catalyst for yielding stereoselective α-olefin polymer, titanium catalyst component supported onto magnesium halide can be applied to the high-activity polymerization of olefin. For most of those catalyst components, not only magnesium halides, for example, magnesium dihalide and magnesium alkoxy halide, but also magnesium compounds containing no halogen can be used, if using a suitable halogenating agent. Exemplifying some of them, for example, in Japanese Unexamined Patent Publication No. 54-123594, a method of reacting a complex consisting of organomagnesium compound and organoaluminum compound with tertiary alkyl halide, and then treating the product with carboxylic ester and titanium tetrachloride is proposed. Also, in Japanese Unexamined Patent Publication No. Sho 54-133584, a method of treating solid product obtainable through the reaction between organomagnesium compound and organic halide compound with electron donor compound, and then supporting titanium tetrachloride thereonto is proposed and, in Japanese Unexamined Patent Publication No. Sho 55-133408, a method of treating solid organomagnesium compound with aromatic alcohol and electron donor compound, and then treating with titanium tetrachloride is proposed, and so on.

For the titanium catalyst component used in the publicly known methods as describe above, titanium tetrachloride is used in almost all cases, but it has a drawback that, when titanium compound is reduced with cocatalyst, it forms clusters, leading to nonuniform active species of catalyst. As the reports relating thereto, for example, Macromol. Chem., 189, 1531 (1988) and Macromol. Chem., Rapid Commun., 14, 85 (1993) can be mentioned.

Moreover, a catalyst system that uses no titanium tetrachloride as a metal source has also been developed and studied extensively. A typical example thereof is one generally called Kaminsky type catalyst, in which metallocene compound having cyclopentadienyl ring is combined with cocatalyst such as methylaluminoxane to perform the homo- or co-polymerization of ethylene or α-olefin.

These catalyst systems are so-called homogeneous catalysts and said to have uniform polymerization active sites. In the case of aiming at the industrial application, however, high-temperature polymerization over 80° C. is required, for example, on polymerization of propylene, and decreased stability of complex and stereoregularity of polymer produced arise problems. For these, a method of introducing substituent into ligand, in particular, cyclopentadienyl ring, a method of crosslinking ligand each other, a method of introducing suitable substituent into crosslinked site, etc. are proposed. However, the modifications of metallocene complex as above accompany complicated organic reactions in general, causing increased cost for catalyst, if attempting to use industrially.

On the other hand, a method of using organometallic complex having no cyclopentadienyl ring, which is called non-metallocene type catalyst, for the homo or co-polymerization of ethylene or α-olefin is also proposed.

For example, in U.S. Pat. No. 5,223,465, a method of using titanium, ziroconium and hafnium complex having a ligand like β-diketone and cocatalyst of organoaluminum such as methyl aluminoxane for the polymerization of ethylene, α-olefin, styrene or the like is proposed. Also, in U.S. Pat. No. 3,393,245, oligomerization of diene using β-diketone complex of nickel is proposed. Also, in Macomol. Chem., Rapid Commun. 15, 655 (1994)), oligomerization of ethylene with β-diketone complex of ziroconium and halogen-containing alkyl aluminum is reported.

The purpose of the invention is to provide a novel catalyst having polymerization activity to α-olefin equivalent to metallocene catalyst without using expensive catalyst component that causes a problem in the metallocene type catalyst and being useful also in the industry, and a method of polymerizing α-olefin such as ethylene or propylene, using the same.

DISCLOSURE OF THE INVENTION

The invention relates to a catalyst component for the polymerization of α-olefin characterized by contacting a complex represented by general formula (1)

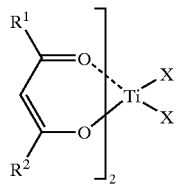

(1)

(wherein $R^1$ and $R^2$ are the same or different and each represents a linear or branched lower alkyl group with $C_1$–$C_6$, alkyl halide with $C_1$–$C_3$ or optionally substituted phenyl group, and X represents a halogen atom), with a magnesium compound. The invention is to provide a catalyst, wherein $R^1$ and $R^2$ are the same or different and preferably each represents methyl group, ethyl group, propyl group, isopropyl group, n-butyl group, isobutyl group, t-butyl group, trifluororrnethyl group or phenyl group, and X represents a chlorine atom.

Moreover, the invention concurrently provides a method of polymerizing α-olefin using the inventive catalyst component. As a concrete method, the invention relates to a method of polymerizing α-olefin using said catalyst and organoaluminum compound in the coexistence or non-coexistence of organic acid or organosilicon compound as a third component, and, as an organoaluminum compound to be used, organoaluminum compound represented by general formula (2)

$$R^3R^4R^5Al \qquad (2)$$

(wherein $R^3$, $R^4$ and $R^5$ are the same or different and each represents a linear or branched lower alkyl group with $C_1$–$C_8$ or halogen atom), or an organoaluminum compound obtainable by partially hydrolyzing one or a plurality of those organoaluminum compounds can be used. Also, as the organic acid of the third component, preferably, aromatic carboxylic ester can be used.

Moreover, as the organosilicon compound of the third component, an organosilicon compound represented by general formula (3)

$$R^6R^7R^8R^9Si \qquad (3)$$

(wherein $R^6$, $R^7$, $R^8$ and $R^9$ are the same or different and each represents a linear, branched or cyclic lower alkyl group with $C_1$–$C_8$, optionally substituted phenyl group or alkoxy group), can be use.

As a catalyst component in the homo- or co-polymerization of α-olefin such as ethylene or propylene, the invention is to provide a catalyst characterized by contacting a complex represented by general formula (1)

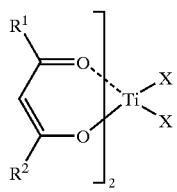

(1)

(wherein $R^1$ and $R^2$ are the same or different and each represents a linear or branched lower alkyl group with $C_1$–$C_6$, alkyl halide with $C_1$–$C_3$ or optionally substituted phenyl group, and X represents a halogen atom), with a magnesium compound, and, at the same time, a method of homo- or co-polymerizing α-olefin such as ethylene or propylene, using said catalyst and organoaluminum compound in the coexistence of or non-coexistence organic acid or organosilicon compound as a third component.

In the general formula (1), as $R^1$ and $R^2$, lower alkyl groups with $C_1$–$C_6$ such as m ethyl group, ethyl group, propyl group, isopropyl group, n-butyl group, isobutyl group and t-butyl group, alkyl halides such as trifluoromethyl group, and phenyl groups which are not substituted or may be substituted with lower alkyl group with $C_1$–$C_3$ such as phenyl group, tolyl group and ethylphenyl group can be mentioned. Preferable are methyl group, t-butyl group, trifluoromethyl group and phenyl group. As X, for example, chlorine atom, bromine atom, iodine atom, etc. can be mentioned. Preferable is chlorine atom.

As such titanium complexes, concretely, for example, bis-(2,4-pentanedionato)titanium dichloride, bis(1,1,1-trifluoro-2,4-pentanedionato)titanium dichloride, bis(2,2-dimethyl-3,5-hexanedionato)titanium dichloride, bis(1-phenyl-1,3-butanedionato)titanium dichloride, bis(1,1,1,5,5,5-hexafluoro-2,4pentanedionato)titanium dichloride, bis(1,1,1-trifluoro-5,5-dimethyl-2,4-hexanedionato)titanium dichloride, bis(1,1,1-trifluoro-4-phenyl-2,4-butanedionato)titanium dichloride, bis (2,2,6,6-tetramethyl-3,5-hexanedionato)titanium dichloride, bis(2,2-dimethyl-5-phenyl-3,5-pentanedionato)titanium dichloride, bis(1,3-diphenyl-1,3-propanedionato)titanium dichloride, etc. can be mentioned.

The titanium complexes can be manufactured easily from titanium tetrachloride and corresponding β-diketone according to the methods described, for example in Inorganic Chemistry 6, 1512 (1967) and Inorganic Synthesis 12, 88 (1970).

Magnesium chloride to be used as a carrier is not particularly restricted, and any of commercial magnesium chloride as it is, such one that was pulverized followed by appropriate particle size adjustment, magnesium chloride that is prepared by using magnesium alkoxide as a starting material or via it, and the like can be used.

The inventive supported catalyst of β-diketone complex of titanium can be prepared easily, for example, by adding said β-diketone complex of titanium to magnesium chloride dispersed into a hydrocarbon solvent such as toluene, hexane or heptane at 0 to 100° C. in an atmosphere of inert gas such as nitrogen or argon, and then keeping contact under stirring for 5 minutes to 48 hours at 0 to 100° C.

Another purpose of the invention is a method of polymerizing α-olefin using the inventive compound.

As α-olefins, for example, ethylene, propylene, butene, octene, etc. can be mentioned. The invention can be applied not only to the homopolymerization of these α-olefins, but also to the copolymerization in combination of these α-olefins.

The polymerization can be conducted using said catalyst in the presence of organoaluminum compound.

As the organoaluminum compounds, organoaluminum compounds represented by general formula (2)

$$R^3R^4R^5Al \quad (2)$$

(wherein $R^3$, $R^4$ and $R^5$ are the same or different and each represents a linear or branched lower alkyl group with $C_1$–$C_8$ or halogen atom), or organoaluminum compound obtainable by partially hydrolyzing one or a plurality of those organoaluminum compounds can be used. As $R^3$, $R^4$ and $R^5$, alkyl groups such as methyl group, ethyl group, propyl group, isopropyl group, butyl group, isobutyl group, amyl group, isoamyl group, n-hexyl group, isohexyl group, n-octyl croup and isooctyl group, and halogen atoms such as chlorine atom, bromine atom and iodine atom can be mentioned. Preferable are methyl group, ethyl group, isobutyl group and chlorine atom.

As concrete examples of such orgnoaluminum compounds, halogen-containing alkylaluminums such as ethylaluminum sesquichloride, ethylaluminum dichloride, diethylaluminum chloride, methylaluminum sesquichloride and dimethylaluminum chloride, alkylaluminums such as trimethylaluminum, triethylaluminum and triisobutylaluminum can be mentioned. Preferable are trimethylaluminum, triethylaluminum and triisobutylaluminum. Moreover, in the invention, partially hydrolyzed products of said organoaluminum compounds. That is, aluminoxanes can also be used. As such partially hydrolyzed products of organoaluminum compounds, sole or combined partially hydrolyzed products of trimethylaluminum, triethylaluminum, triisobutylaluminum, trioctylaluminum and triisooctylaluminum can be mentioned. Preferable is methylaluminoxane being a partially hydrolyzed product of trimethylaluminum.

The addition level of orgnoaluminum compound is 1 to 500 times molar equivalent, preferably 1 to 100 times molar equivalent per 1 atomic equivalent of titanium in catalyst. When using partially hydrolyzed product of organoaluminum compound such as methylaluminoxane, the addition level is 1 to 10000 atomic equivalent, preferably 1 to 1000 atomic equivalent as atomic equivalent of aluminum in partially hydrolyzed product per 1 atomic equivalent of titanium in catalyst.

For achieving high stereoregularity in the polymerization of α-olefin such as propylene, it is preferable to add so-called third component. As such third components, organic acid and organosilicon compound can be mentioned.

As the organic acids, aromatic carboxylic acids such as ethyl benzoate and diethyl phthalate can be mentioned. Preferable is ethyl benzoate. The addition level of aromatic carboxylic acid is 1 to 100 molar equivalent, preferably 1 to 50 molar equivalent per 1 atomic equivalent of titanium in catalyst.

As the organosilicon compounds, organosilicon compounds represented by general formula (3) can be mentioned. As concrete examples of $R^6$, $R^7$, $R^8$ and $R^9$ in general formula (3), lower alkyl groups such as methyl group, ethyl group, propyl group, isopropyl group, butyl group, isobutyl group, amyl group, isoamyl group, n-hexyl group, isohexyl group, n-octyl group and isooctyl group, cyclic alkyl groups such as cyclopropyl group, cyclobutyl group, cyclopentyl group, cyclohexyl group, cycloheptyl group and cyclooctyl group, aromatic substituents such as phenyl group, tolyl group, xylyl group and naphthyl group, and lower alkoxy groups such as methoxy group, ethoxy group, propoxy group, isopropoxy group, butoxy group and isobutoxy group can be mentioned.

As concrete examples of such organosilicon compounds, phenyltrimethoxysilane, phenyltriethoxysilane, diphenyldimethoxysilane, diphenyldiethoxysilane, diisopropyldimethoxysilane, dicyclopentyldimethoxysilane, dihexyldimethoxysilane, etc. can be mentioned.

Preferable are diisopropyldimethoxysilane, dicyclopentyldimethoxysilane and phenyltriethoxysilane.

The addition level of organosilicon compound is 1 to 100 molar equivalent, preferably 1 to 50 molar equivalent per 1 atomic equivalent of titanium in catalyst.

As the polymerization method, any method of solution polymerization, bulk polymerization and vapor phase polymerization can be used. The polymerization conditions should be selected to adapt the process and are not restricted particularly, but the polymerization can be implemented at a polymerization temperature of 0 to 180° C. and polymerization pressure of 1 to 300 kg/cm$^2$.

BRIEF DESCRIPTION OF THE DRAWING

FIG. 1 is an illustration diagram showing the preparation of the inventive catalyst for the polymerization of α-olefin.

BEST EMBODIMENT TO PUT THE INVENTION INTO PRACTICE

In following, the invention will be illustrated in more detail based on examples, but the invention is not confined to these examples.

EXAMPLE 1

[Preparation of Catalyst]

Into a 200 ml Schlenk tube with a stirrer chip therein, 16.1 g of magnesium chloride (80 m$^2$/g) were charged in an atmosphere of nitrogen, and a solution of 0.35 g of bis(acetylacetonato)titanium dichloride complex dissolved into toluene was added thereto, which was stirred for 10 hours at room temperature. Thereafter, the solid components were washed enough with toluene by decantation and dried under reduced pressure to obtain titanium-containing catalyst component. When determined the content of titanium in catalyst obtained by ICP, it was 0.299% by weight.

[Polymerization]

After 100 ml of dehydrated heptane were placed in 300 ml flask with a stirrer chip placed therein and 400 mg of catalyst were injected, inside of flask was replaced with propylene. After saturation, 0.5 ml of toluene solution of 1 M triisobutylaluminum were injected to start the polymerization. The polymerization pressure was 1 atm and the polymerization temperature was 40° C. The polymerization was conducted for 1 hours. After completion of polymerization, supply of propylene gas was stopped and the catalyst component was decomposed with a mixed solution of methyl alcohol with aqueous solution of hydrochloric acid. The polymer in flask was poured into enough methyl alcohol to solidify the polymer and then filtered to collect the solid polymer. When measuring the weight after dried under reduced pressure for 6 hours at 60° C., 2.33 g of polypropylene were obtained.

The percentage of extraction residue of polymer produced with boiling n-heptane was 37.4% by weight.

EXAMPLE 2

Except that 0.75 ml of toluene solution of methylaluminoxane containing 9.2% by weight of aluminum component were used for cocatalyst and that the polymerization time was made to be 0.5 hours, propylene was polymerized almost similarly to Example 1. The yield of polypropylene was 3.86 g and the percentage of extraction residue with boiling n-heptane was 34.3% by weight.

COMPARATIVE EXAMPLE 1

[Preparation of Catalyst]

Except that bis(acetylacetonato)zirconium dichloride was used as a β-diketone complex, catalyst was obtained by a method almost similar to the preparation of catalyst in Example 1. The content of titanium in catalyst was 0.12% by weight.

[Polymerization]

Except that 1 g of said catalyst was used for polymerization as a catalyst, propylene was polymerized almost similarly to Example 1. As a result, only 30 mg of polypropylene were obtained.

COMPARATIVE EXAMPLE 2

Except that 0.75 ml of toluene solution of methylaluminoxane containing 9.2% by weight of aluminum component were used for cocatalyst, propylene was polymerized similarly to Comparative example 1. As a result, the yield of polypropylene was only 10 mg.

COMPARATIVE EXAMPLE 3

Except that 80 mg of bis(acetylacatonato)titanium dichloride were used for polymerization as a catalyst and that toluene was used for solvent, propylene was polymerized similarly to Example 1. As a result, only 10 mg of polypropylene were obtained.

COMPARATIVE EXAMPLE 4

Except that 0.75 ml of toluene solution of methylaluminoxane containing 9.2% by weight of aluminum component were used for cocatalyst, propylene was polymerized similarly to Comparative example 3. As a result, only 10 mg of polypropylene were obtained.

COMPARATIVE EXAMPLE 5

Except that 90 mg of bis(acetylacetonato)zirconium dichloride were used for polymerization as a catalyst, propylene was polymerized similarly to Comparative example 3, but little polymer was obtained.

COMPARATIVE EXAMPLE 6

Except that 0.75 ml of toluene solution of methylaluminoxane containing 9.2% by weight of aluminum component were used for cocatalyst, propylene was polymerized similarly to Comparative example 5, but little polypropylene was obtained.

EXAMPLE 3

Except that 0.5 ml of toluene solution of 1M triethylaluminum were used as a cocatalyst and that the polymerization time was 0.5 hours, propylene was polymerized similarly to Example 1. As a result, the yield of polypropylene was 4.78 g and the percentage of extraction residue with boiling n-heptane was 32.7% by weight.

EXAMPLE 4

Except that 0.5 ml of toluene solution of 1M trimethylaluminum were used as a cocatalyst and the polymerization time was 0.5 hours, propylene was polymerized similarly to Example 1. As a result, the yield of polypropylene was 6.28 g and the percentage of extraction residue with boiling n-heptane was 33.6% by weight.

EXAMPLE 5

Except that 0.5 ml of toluene solution of 1M diethylaluminum chloride were used as a cocatalyst, propylene was polymerized similarly to Example 1. As a result the yield of polypropylene was 0.43 g and the percentage of extraction residue with boiling n-heptane was 22.4% by weight.

EXAMPLE 6

Except that 33 mg of ethyl benzoate were coexisted on polymerization as a third component, propylene was polymerized similarly to Example 1. As a result, the yield of polypropylene was 0.53 g and the percentage of extraction residue with boiling n-heptane was 90.3% by weight.

EXAMPLE 7

[Preparation of catalyst]

Except that bis(1-phenyl-1,3-butadionato)titanium dichloride was used as a β-diketone complex, catalyst was obtained by a method almost similar to the preparation of catalyst in Example 1. The content of titanium in catalyst was 0.18% by weight.

[Polymerization]

Except that 660 mg of said catalyst were used as a catalyst and 0.5 ml of toluene solution of 1M triethylaluminum were used as a cocatalyst for polymerization, propylene was polymerized almost similarly, to Example 1. As a result, the yield of polypropylene was 5.73 g and the percentage of extraction residue with boiling n-heptane was 26.5% by weight.

EXAMPLE 8

Except that 33 mg of ethyl benzoate were coexisted on polymerization as a third component, propylene was polymerized similarly to Example 7. As a result, the yield of polypropylene was 1.45 g and the percentage of extraction residue with boiling n-heptane was 85.8% by weight.

EXAMPLE 9

[Preparation of catalyst]

Except that bis(2,2-dimethyl-3,5-hexanedionato)titanium dichloride was used as a β-diketone complex, catalyst was obtained by a method almost similar to the preparation of catalyst in Example 1. The content of titanium in catalyst was 0.18% by weight.

[Polymerization]

Except that 675 mg of said catalyst were used as a catalyst and 0.5 ml of toluene solution of 1M triethylaluminum were used as a cocatalyst for polymerization, propylene was polymerized almost similarly to Example 1. As a result, the yield of polypropylene was 6.68 g and the percentage of extraction residue with boiling n-heptane was 25.8% by weight.

EXAMPLE 10

Except that 33 mg of ethyl benzoate were coexisted on polymerization as a third component, propylene was polymerized similarly to Example 9. As a result, the yield of polypropylene was 0.35 g and the percentage of extraction residue with boiling n-heptane was 86.5% by weight.

EXAMPLE 11

[Preparation of catalyst]

Except that bis(1,1,1-trifluoro-4-phenyl-2,4-butadionato) titanium dichloride was used as a β-diketone complex, catalyst was obtained by a method almost similar to the preparation of catalyst in Example 1. The content of titanium in catalyst was 0.05% by weight.

[Polymerization]

Except that 2.5 g of said catalyst were used as a catalyst and 0.5 ml of toluene solution of 1M triethylaluminum were used as a cocatalyst for polymerization, propylene was polymerized almost similarly to Example 1. As a result, the yield of polypropylene was 22.47 g and the percentage of extraction residue with boiling n-heptane was 22.4% by weight.

EXAMPLE 12

Except that 33 mg of ethyl benzoate were coexisted on polymerization as a third component, propylene was polymerized similarly to Example 11. As a result, the yield of polypropylene was 8.75 g and the percentage of extraction residue with,boiling n-heptane was 55.1% by weight.

EXAMPLE 13

After 100 ml of dehydrated heptane was placed in a 300 ml flask with a stirrer chip placed therein and 185 mg of catalyst used in Example 1 were injected, inside of flask was replaced with ethylene. After saturation, 2 ml of 1-hexene were injected. The polymerization was started by injecting 0.5 ml of 1M triisobutylaluminum. The polymerization pressure was 1 atm and the polymerization temperature was 40° C. The polymerization was conducted for 14 minutes. After completion of polymerization, supply of ethylene gas was stopped and the catalyst component was decomposed by a mixed solution of methyl alcohol with aqueous solution of hydrochloric acid. The polymer in flask was poured into enough methyl alcohol to solidify the polymer and then filtered to collect the solid polymer. When measuring the weight after dried under reduced pressure for 6 hours at 60° C., 0.79 g of ethylene-1-hexene copolymer were obtained. When measuring the melting point of produced polymer by DSC, it was 125.5° C. The content of 1-hexene determined by $^{13}$C-NMR was 6.0 mol %.

EXAMPLE 14

Except that 4 ml of 1-hexene were used and that the polymerization time was made to be 15 minutes, copolymerization of ethylene-1-hexene was conducted almost similarly to Example 13. The yield of ethylene-1-hexene copolymer was 0.78 g and the melting point thereof was 122.4° C. The content of 1-hexene determined by $^{13}$C-NMR was 6.9 mol %

EXAMPLE 15

Except that 8 ml of 1-hexene were used and that the polymerization time was made to be 16 minutes, copolymerization of ethylene-1-hexene was conducted almost similarly to Example 13. The yield of ethylene-1-hexene was 0.92 g and the melting point thereof was 119.8° C. The content of 1-hexene determined by $^{13}$C-NMR was 19.3 mol %.

EXAMPLE 16

Except that 16 ml of 1-hexene were used and that the polymerization time was made to be 19 minutes, copolymerization of ethylene-1-hexene was conducted almost similarly to Example 13. The yield of ethylene-1-hexene copolymer was 0.61 g and the melting point thereof was 119.8° C. The content of 1-hexene determined by $^{13}$C-NMR was 20.3 mol %.

EXAMPLE 17

Except that 4 ml of 1-hexene were used, that 0.5 ml of 1M trimethylaluminum were used for cocatalyst and that the polymerization time was made to be 6 minutes plus 45 seconds, copolymerization of ethylene-1-hexene was conducted almost similarly to Example 13. The yield of ethylene-1-hexene was 0.61 g and the melting point thereof was 119.8° C. the content of 1-hexene determined by $^{13}$C-NMR was 14.7 mol %.

EXAMPLE 18

Except that 2.8 mg of diisopropyldimethoxysilane (DIPDMS) were used on polymerization as a third component, propylene was polymerized almost similarly to Example 11. As a result, the yield of polypropylene was 2.70 g and the percentage of extraction residue with boiling n-heptane was 75.5% by weight. Moreover, the number average molecular weight (Mn) thereof was $6 \times 10^4$ and the melting temperature (Tm) thereof was 163.7 ° C.

EXAMPLE 19

Except that the amount of DIPDMS in Example 18 was made to be 5.5 mg, propylene was polymerized almost similarly to Example 18. The results are as shown in Table 1.

EXAMPLE 20

Except that DIPDMS in Example 18 was made to be 10.9 mg, propylene was polymerized almost similarly to Example 18. The results are as shown in Table 1.

EXAMPLE 21

Except that DIPDMS in Example 18 was made to be 21.8 mg, propylene was polymerized almost similarly to Example 18. The results are as shown in table 1.

EXAMPLE 22

Except that DIPDMS in Example 18 was made to be 10.9 mg and 0.7 ml of 1M triisobutylaluminum were used for cocatalyst, propylene was polymerized almost similarly to Example 18. The results are as shown in Table 1.

EXAMPLE 23

Except that 14.1 mg of dicyclopentyldimethoxysilane (DCPDMS) were coexisted in place of DIPDMS in Example 18, propylene was polymerized almost similarly to Example 18. The results are as shown in Table 1.

EXAMPLE 24

Except that 14.9 mg of phenyltriethoxysilane (PTES) were coexisted in place of DIPDMS in Example 18, propylene was polymerized almost similarly to Example 18. The results are shown in Table 1.

COMPARATIVE EXAMPLE 7

Except that polymerization was conducted in the coexistence of 3.9 mg of ethyl benzoate (EB) in place of DIPDMS in Example 18, propylene was polymerized similarly to Example 18. The results are as shown in Table 1.

COMPARATIVE EXAMPLE 8

Except that polymerization was conducted in the coexistence of 8 mg of EB in place of DIPDMS in Example 18, propylene was polymerized similarly to Example 18. The results are as shown in Table 1.

COMPARATIVE EXAMPLE 9

Except that polymerization was conducted in the coexistence of 15.9 mg of EB in place of DIPDMS in Example 18, propylene was polymerized similarly to Example 18. The results are as shown in Table 1.

COMPARATIVE EXAMPLE 10

Except that polymerization was conducted in the coexistence of 5.8 mg of dibutyl phthalate (DNBP) in place of DIPDMS in Example 18, propylene was polymerized similarly to Example 18. The results are as shown in Table 1.

COMPARATIVE EXAMPLE 11

Except that polymerization was conducted in the coexistence of 11.7 mg of DNBP in place of DIPDMS in Example 18, propylene was polymerized similarly to Example 18. The results are as shown in Table 1.

COMPARATIVE EXAMPLE 12

Except that polymerization was conducted in the coexistence of 23.4 mg of DNBP in place of DIPDMS in Example 18, propylene was polymerized similarly to Example 18. The results are as shown in Table 1.

TABLE 1

| | Third component | Activity (kg-PP/mol-Ti/hr) | I.I. (wt %) | Mn ($\times 10^4$)* | Tm (° C.)* |
|---|---|---|---|---|---|
| Example 19 | D I P D M S | 131 | 85.7 | 8.4 | 164.9 |
| Example 20 | D I P D M S | 107 | 91 | 10.5 | 164.3 |
| Example 21 | D I P D M S | 69 | 90.8 | 15.3 | 165.7 |
| Example 22 | D I P D M S | 49 | 86 | 17.1 | 165.5 |
| Example 23 | D C P D M S | 61 | 73.5 | 7.9 | 162.4 |
| Example 24 | PTES | 90 | 88.8 | 6.3 | 165.5 |
| Comparative example 7 | EB | 344 | 39.7 | 3.5 | 158.7 |
| Comparative example 8 | EB | 163 | 55 | 3.7 | 158.6 |
| Comparative example 9 | EB | 120 | 67.4 | 4 | 160.8 |
| Comparative example 10 | DNBP | 210 | 43 | 5.6 | 158.6 |
| Comparative example 11 | DNBP | 79 | 57.2 | 6.1 | 159.3 |
| Comparative example 12 | DNBP | 40 | 62.4 | 5.8 | 158.6 |

*Insolubles into boiling heptane

UTILIZATION IN THE INDUSTRY

According to the invention, it is possible to provide a catalyst component of and its polymerizing method useful for the polymerization of α-olefin beneficial economically as well.

What is claimed is:

1. A catalyst, which is a complex selected from the group consisting of bis(1,1,1-trifluoro-2,4-pentanedionato) titanium dichloride; bis(2,2-dimethyl-3,5-hexanedionato)

titanium dichloride; bis(1,1,1,5,5,5-hexafluoro-2,4-pentanedionato)titanium dichloride; bis(1,1,1-trifluoro-5,5-dimethyl-2,4-hexanedionato)titanium dichloride; bis(2,2,6,6-tetramethyl-3,5-hexanedionato)titanium dichloride; bis(2,2-dimethyl-5-phenyl-3,5-pentanedionato)titanium dichloride; and bis(1,3-diphenyl-1,3-propanedionato)titanium dichloride, wherein said complex is supported on magnesium chloride.

2. A method of polymerizing an α-olefin, comprising contacting said α-olefin with (A) using a catalysts, which is a complex selected from the group consisting of bis(1,1,1-trifluoro-2,4-pentanedionato)titanium dichloride; bis(2,2-dimethyl-3,5-hexanedionato)titanium dichloride; bis(1,1,1,5,5,5-hexafluoro-2,4-pentanedionato)titanium dichloride; bis(1,1,1-trifluoro-5,5-dimethyl-2,4-hexanedionato)titanium dichloride; bis(2,2,6,6-tetramethyl-3,5-hexanedionato)titanium dichloride; bis(2,2-dimethyl-5-phenyl-3,5-pentanedionato)titanium dichloride; and bis(1,3-diphenyl-1,3-propanedionato)titanium dichloride, wherein said complex is supported on magnesium chloride; and (B) an organoaluminum compound.

3. The method of claim 2, wherein said organoaluminum compound has general formula (2)

$$R^3R^4R^5Al \quad (2)$$

wherein $R^3$, $R^4$ and $R^5$ are the same or different and each represents a linear or branched $C_1$–$C_8$ alkyl group or a halogen atom.

4. The method of claim 3, wherein said α-olefin is polymerized in the presence of an organic acid or an organosilicon compound.

5. The method of claim 4, wherein said organic acid is an aromatic carboxylic ester.

6. The method of claim 4, wherein said organosilicon compound has general formula (3)

$$R^5R^7R^8R^9Si \quad (3)$$

wherein each of $R^6$, $R^7$, $R^8$, and $R^9$ are the same or different and each is a linear, branched, or cyclic $C_1$–$C_8$ alkyl group, substituted or unsubstituted phenyl, or an alkoxy group.

7. The method of claim 3, wherein said α-olefin is selected from the group consisting of ethylene, propylene, butene, hexene, and octene.

8. The method of claim 2, wherein said organoaluminum compound is obtained by partially hydrolyzing one or more compounds having general formula (2)

$$R^3R^4R^5Al \quad (2)$$

wherein $R^3$, $R^4$ and $R^5$ are the same or different and each represents a linear or branched $C_1$–$C_8$ alkyl group or a halogen atom.

9. The method of claim 8, wherein said α-olefin is polymerized in the presence of an organic acid or an organosilicon compound.

10. The method of claim 9, wherein said organic acid is an aromatic carboxylic ester.

11. The method of claim 9, wherein said organosilicon compound has general formula (3)

$$R^6R^7R^8R^9Si \quad (3)$$

wherein each of $R^6$, $R^7$, $R^8$, and $R^9$ are the same or different and each is a linear, branched, or cyclic $C_1$–$C_8$ alkyl group, substituted or unsubstituted phenyl, or an alkoxy group.

12. The method of claim 8, wherein said α-olefin is selected from the group consisting of ethylene, propylene, butene, hexene, and octene.

13. The method of claim 2, wherein said α-olefin is polymerized in the presence of an organic acid or an organosilicon compound.

14. The method of claim 13, wherein said organic acid is an aromatic carboxylic ester.

15. The method of claim 13, wherein said organosilicon compound has general formula (3)

$$R^6R^7R^8R^9Si \quad (3)$$

wherein each of $R^6$, $R^7$, $R^8$, and $R^9$ are the same or different and each is a linear, branched, or cyclic $C_1$–$C_8$ alkyl group, substituted or unsubstituted phenyl, or an alkoxy group.

16. The method of claim 2, wherein said α-olefin is selected from the group consisting of ethylene, propylene, butene, hexene, and octene.

* * * * *

UNITED STATES PATENT AND TRADEMARK OFFICE
CERTIFICATE OF CORRECTION

PATENT NO.    : 6,420,500 B1
DATED         : July 16, 2002
INVENTOR(S)   : Eiichi Kaji et al.

It is certified that error appears in the above-identified patent and that said Letters Patent is hereby corrected as shown below:

Column 2,
Line 43, "trifluoronethyl" should read -- trifluoromethyl --
Line 66, "$R^6R^6R^8R^9Si$ (3)" should read -- $R^6R^7R^8R^9Si$ (3) --

Column 3,
Line 30, "m ethyl" should read -- methyl --

Column 8,
Line 25, "with,boiling" should read -- with boiling --
Line 43, "C.," should read -- C,. --

Column 9,
Line 44, "table 1" should read -- Table 1 --

Column 10,
Line 61, "component of and" should read -- component and --

Column 11,
Line 40, "$R^5R^7R^8R^9Si$" should read -- $R^6R^7R^8R9Si$ --

Signed and Sealed this

Twenty-ninth Day of April, 2003

JAMES E. ROGAN
*Director of the United States Patent and Trademark Office*